US008982719B2

(12) United States Patent
Seetharaman et al.

(10) Patent No.: US 8,982,719 B2
(45) Date of Patent: *Mar. 17, 2015

(54) DYNAMICALLY TROUBLESHOOTING VOICE QUALITY

(75) Inventors: Anantha Narayanan Seetharaman, Santa Clara, CA (US); Jayesh A. Chokshi, Cupertino, CA (US); Jennifer Mun Blatnik, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 13/156,649

(22) Filed: Jun. 9, 2011

(65) Prior Publication Data

US 2011/0235543 A1    Sep. 29, 2011

Related U.S. Application Data

(63) Continuation of application No. 11/748,233, filed on May 14, 2007, now Pat. No. 7,978,620.

(51) Int. Cl.
| | |
|---|---|
| G01R 31/08 | (2006.01) |
| G06C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 29/06 | (2006.01) |
| H04L 12/24 | (2006.01) |

(52) U.S. Cl.
CPC .............. *H04L 65/605* (2013.01); *H04L 65/80* (2013.01); *H04L 41/0213* (2013.01); *H04L 43/0829* (2013.01); *H04L 43/0852* (2013.01); *H04L 43/087* (2013.01); *H04L 65/1083* (2013.01)
USPC ........... 370/252; 370/241; 370/250; 370/251; 379/32.01; 379/35

(58) Field of Classification Search
CPC ....................................................... H04M 3/22
USPC ..................... 370/241, 250, 251; 379/32.01
See application file for complete search history.

(56) References Cited

U.S. PATENT DOCUMENTS

| | | | | |
|---|---|---|---|---|
| 6,870,845 | B1 * | 3/2005 | Bellovin et al. ................ | 370/392 |
| 7,447,909 | B2 * | 11/2008 | Reith ............................ | 713/183 |
| 7,460,467 | B1 * | 12/2008 | Corcoran ....................... | 370/208 |
| 2003/0078041 | A1 * | 4/2003 | Dikmen et al. ................ | 455/433 |
| 2005/0076117 | A1 * | 4/2005 | Hou et al. ....................... | 709/224 |
| 2005/0122963 | A1 * | 6/2005 | Jeon et al. ....................... | 370/352 |
| 2006/0039358 | A1 * | 2/2006 | Kim ................................ | 370/352 |
| 2007/0147258 | A1 * | 6/2007 | Mottishaw et al. ........... | 370/241 |
| 2007/0168591 | A1 * | 7/2007 | Chua ............................... | 710/72 |
| 2008/0317019 | A1 * | 12/2008 | Popoviciu et al. ............ | 370/389 |
| 2010/0150138 | A1 * | 6/2010 | Bjorsell et al. ................ | 370/352 |
| 2010/0253643 | A1 * | 10/2010 | McKay .......................... | 345/173 |

* cited by examiner

*Primary Examiner* — Ayaz Sheikh
*Assistant Examiner* — Tarell Hampton
(74) *Attorney, Agent, or Firm* — Tucker Ellis LLP (57) ABSTRACT

In an example embodiment, a method for dynamically troubleshooting voice quality. The method comprises generating a request to intercept a predetermined data stream on a network, acquiring a replicated copy of the intercepted data stream responsive to the request and analyzing the replicated copy of the intercepted data stream.

20 Claims, 4 Drawing Sheets

DYNAMICALLY TROUBLESHOOTING VOICE QUALITY

CROSS REFERENCE TO RELATED APPLICATIONS

This application is a continuation of U.S. patent application Ser. No. 11/748,233, filed May 14, 2007 now U.S. Pat. No. 7,978,620.

BACKGROUND

Voice quality can be measured by subjective or by objective methods. International groups carried extensive standardization work on this field. Subjective methods are listening experiments that involve a group of listeners that are presented with voice material. Each individual is asked to rate the speech quality according to a scale from 1 to 5. By averaging the opinion scores a number that reflects the speech quality is obtained. This number is called Mean Opinion Score (MOS) and it is well known for the quality characterization of speech coders. ITU Recommendation P.800 discusses subjective methods and provides with guidelines on how to obtain reliable and reproducible test results.

Objective measurement systems for speech quality measurement may use two signals as their input, namely an original signal (reference pattern) and the corresponding output signal after its transition through the network under test. The two signals are compared and an average score reflecting the voice quality is obtained. A popular objective method is ITU standard P.861 (1998) known as Perceptual Speech Quality Measurement (PSQM). PSQM was originally designed to objectively evaluate the quality of voice band (300-3400 HZ) speech codec, not to test live conditions over a communication channel.

Several factors affect voice quality in Voice over Packet networks: Delay, Jitter, Packet loss and Speech compression. The Pre-processing steps of Time alignment and Loudness adjustment are simple when the complete signals are available for storage and when the processing can be done off line. These tasks become very complicated if they need to be done in real time under network-degraded conditions. Voice quality measurements are extremely sensitive to any misadjustment during the Pre-processing steps. Misadjustments may be caused by erroneous detection of the beginning of the speech test material and also by missing parts of the speech test signal due to packet loss. They also include effects such as time scale modifications introduced by adaptive jitter buffers embedded in the Voice over Packet equipment. Such problems may severely degrade voice quality measurements.

OVERVIEW OF EXAMPLE EMBODIMENTS

The following presents a simplified summary of example embodiments of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an example embodiment disclosed herein, there is described a method for analyzing a predetermined data stream. The method comprises generating a request to intercept a predetermined data stream on a network, acquiring a replicated copy of the predetermined data stream responsive to the request and analyzing the replicated copy of the predetermined data stream.

In an example embodiment disclosed herein, there is described an apparatus suitably adapted for analyzing a data stream. The apparatus comprises an interface for acquiring data representative of a predetermined data stream to intercept, a communication port coupled to a network in data communication with the data stream and voice quality logic coupled to the interface and the communication port. The voice quality logic is responsive to the interface acquiring data representative of the predetermined data stream to intercept to transmit a request through the communication port to intercept the predetermined data stream. A replicated copy of the predetermined data stream is received via the communication port is analyzed by the voice quality logic.

Still other objects of the present invention will become readily apparent to those skilled in this art from the following description wherein there is shown and described an example embodiment of this invention, simply by way of illustration of at least one of the best modes best suited to carry out the invention.

As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrates examples of the present invention, and together with the description serve to explain the principles of the invention.

DESCRIPTION OF EXAMPLE EMBODIMENTS

This description provides examples not intended to limit the scope of the invention, as claimed. The figures generally indicate the features of the examples, where it is understood and appreciated that like reference numerals are used to refer to like elements.

In an example embodiment, there is described herein a method to provide the actual stream, such as a voice stream, a video stream, and/or a data stream for an endpoint to a network administrator for troubleshooting purposes. For example, this can enable a network administrator to re-recreate a voice call and hear the actual quality of the voice call, or enable a network administrator to perform other voice quality analysis on the stream. Although the following description describes embodiments for dynamically troubleshooting voice quality, this is merely for ease of illustration and should not be construed as limiting the present invention to voice streams as those skilled in the art should readily appreciate that the example embodiments can also be used to dynamically troubleshoot any type of data stream, such as a video stream and/or an audiovisual stream.

Figure 1:
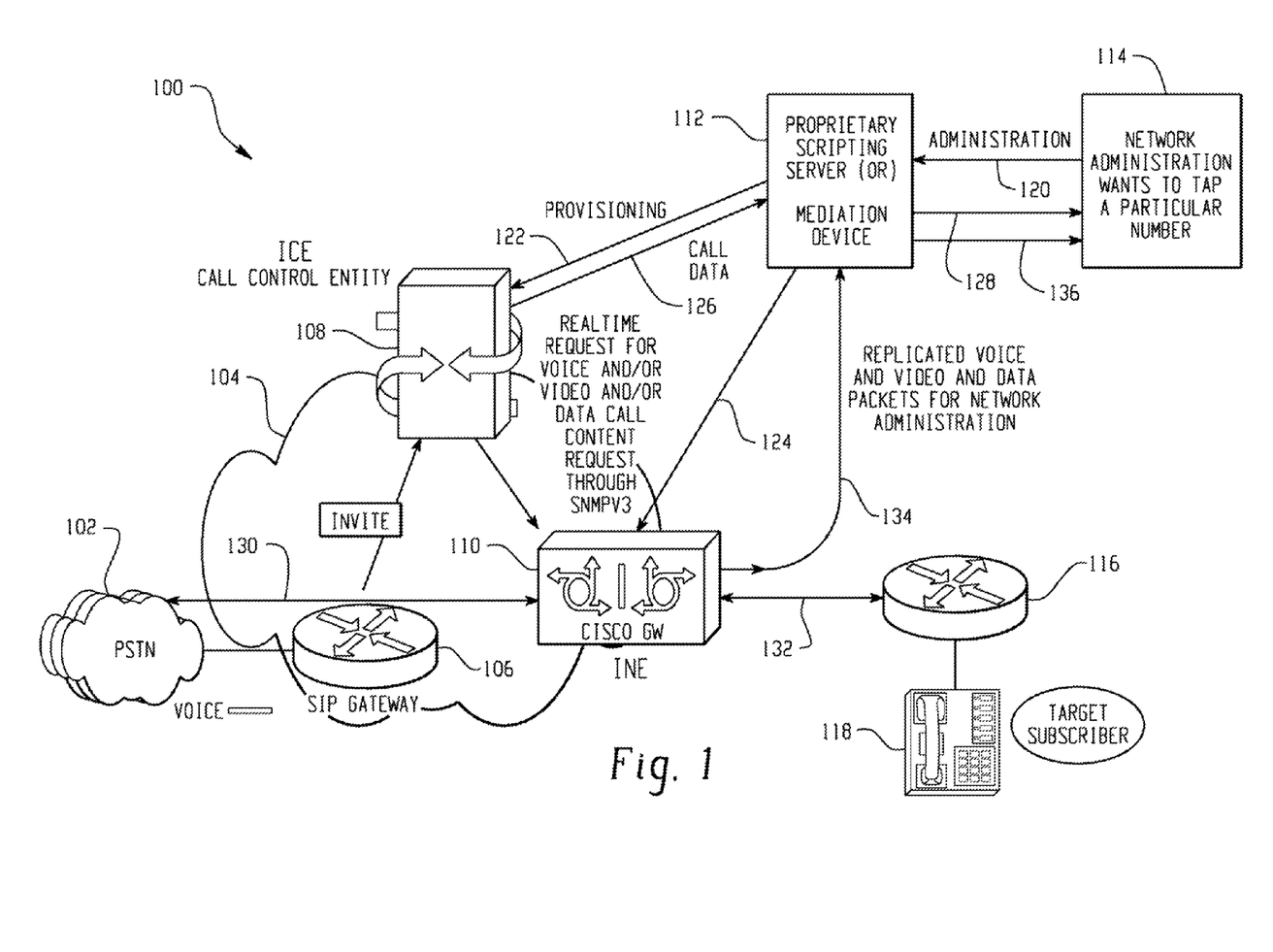
FIG. 1 illustrates an example of a system configured to dynamically troubleshoot voice quality.

Referring to FIG. 1, there is illustrated a system 100 configured for dynamically troubleshooting voice quality. System 100 comprises a Public Switched Telephone Network (PSTN) 102 coupled to a Local Area Network (LAN) 104 by a Session Initiation Protocol (SIP) gateway 106. In an example embodiment, LAN 104 is a packet switched network, such as an IP compatible network. Disposed on LAN 104 are an Intercepting Control Element (ICE) 108 and an Intercepting Network Element (INE) 110.

ICE 108 (Intercept Control Element) and INE 110 may be referred to as Intercept Access Points (IAPs). ICE 108 can provide call setup services and is an identification (ID) IAP that provides intercept related information (IRI) for the data stream to be intercepted (for example the target's username and IP address, other party's phone number, duration of call, time call was made, etc.). In an example embodiment, ICE 108 is an authentication, authorization and accounting (AAA) server. The IRI helps a service provider determine which content IAP (e.g. router, such as router 116) the data stream passes through.

INE 110 is a content IAP. A content IAP is a device that the data stream passes through. INE 110 intercepts traffic to and from a target (e.g. target device 118). INE 110 forwards the stream to router 116 for delivery to target device 118. INE 110 also replicates a copy of the data stream that is forwarded to the network administrator device 114. In an example embodiment, the replicated copy of the data stream passes through device 112, which may be a mediation device or a proprietary scripting device. By forwarding a replicated copy of the data stream (or streams) at INE 110, the administrator obtains a real-time copy of the data stream and can troubleshoot the data stream in real-time. For example, an administrator can obtain a voice stream from INE 110 and can perform real-time diagnostics to the stream, and/or obtain an audio output of the stream to determine voice quality. This also enables an administrator to obtain the same stream being sent and/or received by target device 118.

In an example embodiment, when a subscriber, such as a user of target device 118, calls a service provider (e.g. the VoIP phone service provider) to report voice quality issues, a network administrator receiving the call can request the phone number or IP address of target device 118. The network administrator can then request the subscriber make a telephone call (e.g. to the number the caller was talking to when the voice quality problem was discovered, hereinafter referred as the 'target call') or retry the same application.

The network administrator can request an intercept for the target call. For example, the network administrator can enter data via a user interface provided at administrator device 114. In an example embodiment, the administrator edits a Tool Command Language (TCL) script which searches for the RTP port and IP address of the call that is being placed. Administrator device 114 forwards data representative of the request 120 to device 112.

In an example embodiment, the TCL script triggers Simple Network Management Protocol (SNMP) commands for tapping the media. For example, for a system compatible with Cisco's Lawful Intercept, available from Cisco Systems, Inc., 170 W. Tasman Dr., San Jose, Calif. 95134 the commands use one or more of several management information base (MIB) objects, such as CISCO-TAP2-MIB (TAP2-MIB), CISCO-IP-TAP-MIB (IP-TAP-MIB) and/or CISCO-USER-CONNECTION-TAP-MIB (USER-CONNECTION-TAP-MIB). The aforementioned MIBs provide the ability to support Layer 2 and/or Layer 3 taps. For example, Layer 2 taps are session based taps that intercept all traffic to and from the session regardless of its Layer 3 content. Layer 2 taps are configured via SNMPv3 provisioning. Layer 2 taps use TAP2-MIB and USER-CONNECTION-TAP-MIB. Layer 3 taps perform intercepts at the IP layer that are accessible via SNMPv3 provisioning. Layer 3 taps use TAP2-MIB and IP-TAP-MIB.

For example, the CISCO-TAP2-MIB contains SNMP management objects that control lawful intercepts on INE 110. Device 112 (e.g. a mediation device) uses the MIB to configure and run lawful intercepts on targets whose traffic passes through the INE 110. The admin function (running on the mediation device) issues SNMPv3 'set' and 'get' requests to the INE 110's CISCO-TAP2 MIB to setup and initiate a lawful intercept.

Based on the provisioned MIB values, the data stream can be obtained from the same server for analysis. For example, employing a voice quality module, the packets can be inspected for bad packets, no media packets, malfunctions, Jitter, Latency, Packet Sequence error, MOS, PSQM, etc. The illustrated embodiment enables any type of debugging because the real media stream is captured.

In an example embodiment, for intercepting a VoIP call, TAP2-MIB provisions the Mediation device (e.g. device 112) and generic stream. IP-TAP-MIB covers provisioning the IP intercept (VoIP intercept is a subset of IP intercept). Device 112 (functioning as a mediation device) automatically provisions the intercepts (e.g. employs streams 122 and 124 to setup the intercepts from ICE 108 and INE 110 respectively) when the target call is setup and removes the intercept when the target call is disconnected.

Voice stream 130 represents the data stream for the target call between PSTN 102 and INE 110. In the illustrated example embodiment, data stream 130 is a bi-directional stream routed through SIP gateway 106 to PSTN 102 and via network 104 through INE 110 to router 116 to target device 118. The data stream for the target call is routed through INE 110 and router 116 via stream 132. Router 116 routes the stream to target device 118.

Call setup information for the target call is sent to device 114 via stream 126. A replicated copy of stream 130 is sent by INE 110 to device 112 via stream 134. In an example embodiment, streams 126, 134 are secured (e.g. encrypted) to prevent unauthorized snooping. Call setup information is forwarded to administration device 114 from device 112 via stream 128. Call content is forwarded to administration device 114 from device 112 via stream 136. In an example embodiment, administration device 114 and/or device 112 comprise a voice quality module.

Figure 2:
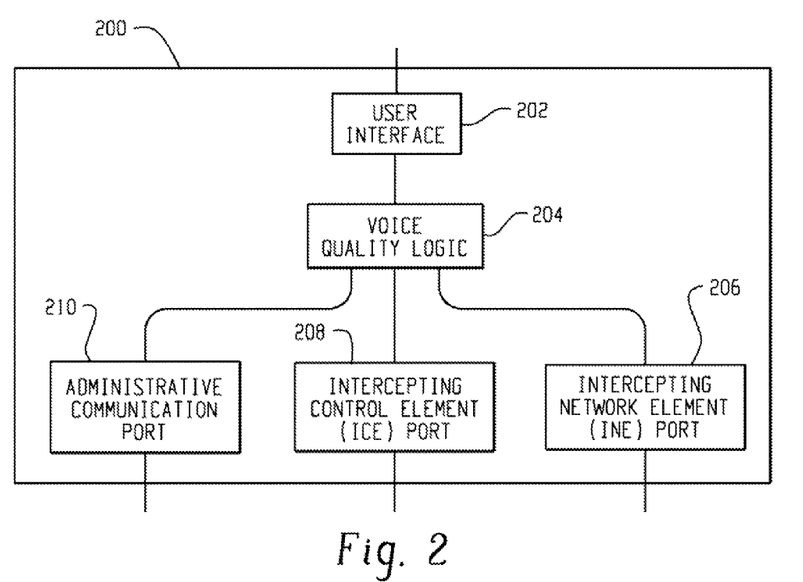
FIG. 2 illustrates an example of a network administrative device configured to dynamically troubleshoot voice quality.

FIG. 2 illustrates an example of a network administrative device 200 configured to dynamically troubleshoot voice quality. Administrative device suitably comprises a user interface 202 enabling the device 200 to receive data representative of a stream to intercept from an associated user. User interface 202 may suitably comprise a means for receiving data and/or outputting data. For example, user interface 202 can be equipped with an alphanumeric keypad, pointing device, touchscreen, and/or command line interface (CLI) for receiving the data representative of a stream to intercept. User interface 202 can also be equipped with a video display and/or audio device for outputting the stream or data associated with the stream (such as packet loss rate, % of bad packets, etc.).

A voice quality module (voice quality logic) 204 is coupled to user interface 202. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

Device 204 further comprises an INE port 206, ICE port 208 and administrative communication port 210. In an example embodiment, ports 206, 208, 210 are logical ports coupled to the same physical port (e.g. the signals sent and/or received by ports 206, 208, 210 are via the same physical communication port).

In operation, when data representative of a stream to intercept is received by user interface 202, the data is forwarded to voice quality logic 204. Voice quality logic 204 sends a request to intercept the stream through administrative communication device 210 to an external device such as a scripting server, mediation device, or similar device. For voice data streams, call content is received on INE port 206. Call setup or IRI data is received on ICE port 208. Call content (e.g. a replicated copy of the intercepted data stream) is forwarded from INE port 206 to voice quality logic 204.

The intercepted stream can be any type of data stream or media stream such as a voice stream (e.g. a VoIP stream), video stream and/or an audiovisual stream. For a voice stream, the request to intercept the may comprise a Real-Time Transport Protocol port and an Internet Protocol address of the data stream at a voice gateway.

Voice quality logic 204 can be configured to perform any suitably voice quality analysis on the replicated data stream. For example, voice quality logic 204 can perform one or more of generating a Mean Opinion Score for the replicated data stream and/or generating a Packet Perceptual Speech Quality Measurement for the replicated data stream. Furthermore, voice quality logic 204 can be configured to analyze signal parameters and the waveform of the replicated copy of the predetermined data stream. In an example embodiment, voice quality logic 204 is configured to determine a packet loss rate for the replicated copy of the predetermined data stream. In an example embodiment, voice quality logic 204 is configured for analyzing whether the replicated copy of the predetermined data stream contains data packets with errors.

Figure 3:
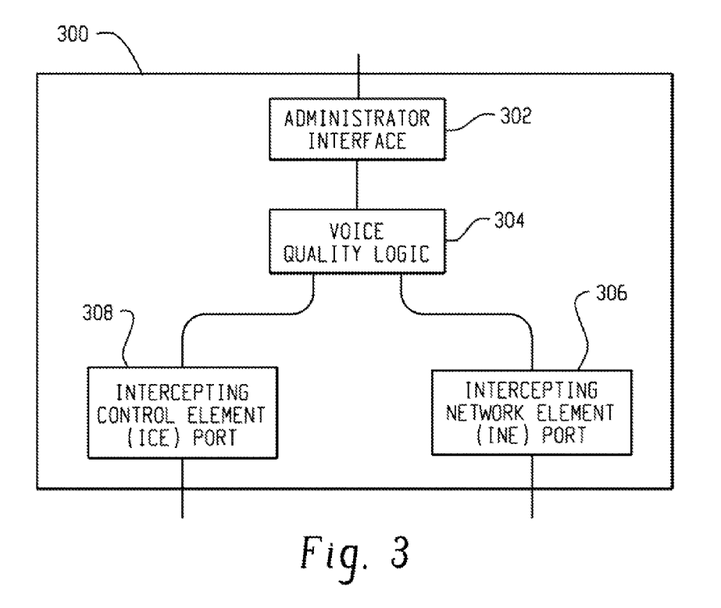
FIG. 3 illustrates an example of a mediation device configured to dynamically troubleshoot voice quality.

FIG. 3 illustrates an example of a mediation device 300 configured to dynamically troubleshoot voice quality. Mediation device 300 comprises an administrator interface for receiving data representative of a data stream to intercept and/or outputting the data stream. In an example embodiment, mediation device is in data communication with an a network administrative device, such as network administrative device 200 described in FIG. 2.

In an example embodiment, administrator interface comprises a user interface enabling administrator interface 302 to receive data representative of a stream to intercept from an associated user. The user interface may suitably comprise a means for receiving data and/or outputting data. For example, the user interface can be equipped with an alphanumeric keypad, pointing device, touchscreen, and/or command line interface (CLI) for receiving the data representative of a stream to intercept. The user interface can also be equipped with a video display and/or audio device for outputting the stream or data associated with the stream (such as packet loss rate, % of bad packets, etc.).

Intercepting Network Element (INE) port 306 is in data communication with an INE and is operative to send and receive data with the INE. Intercepting control element (ICE) port 308 is in data communication with an ICE and is operative to send and receive data with the ICE.

Voice quality logic 304 is coupled to administrator interface 302, INE port 306 and ICE port 308. Voice quality logic 304 is operative to receive data representative of a data stream to intercept from administrator interface 302. Voice quality logic 304 is responsive to receiving the data representative of a data stream to setup and initiate the intercept. For example, for a voice data stream voice quality logic 304 can generate the appropriate SNMP management objects to intercept the stream. For example, the CISCO-TAP2-MIB described herein contains SNMP management objects that control lawful intercepts on an INE. Voice quality logic 304 uses the MIB to configure and run lawful intercepts on targets whose traffic passes through the INE. Voice quality logic 304 issues SNMPv3 'set' and 'get' requests to the CISCO-TAP2-MIB executing at the INE to setup and initiate a lawful intercept.

In an example embodiment, voice quality logic 304 is responsive to receiving call data from an ICE and/or call content from an INE to forward the call data and/or call content to administrator interface 302. Administrator interface 302 forwards the call data and/or content to a network administrator. For example, the data may be forwarded via a network to a network administrator terminal. In another example embodiment, the administrator interface 302 comprises a user output device, such as an audio output device and/or a video output device.

In an example embodiment, voice quality logic 304 comprises logic for performing call analysis. For example voice quality logic 304 can be configured to perform voice quality analysis on the call content received in INE port 306.

Figure 4:
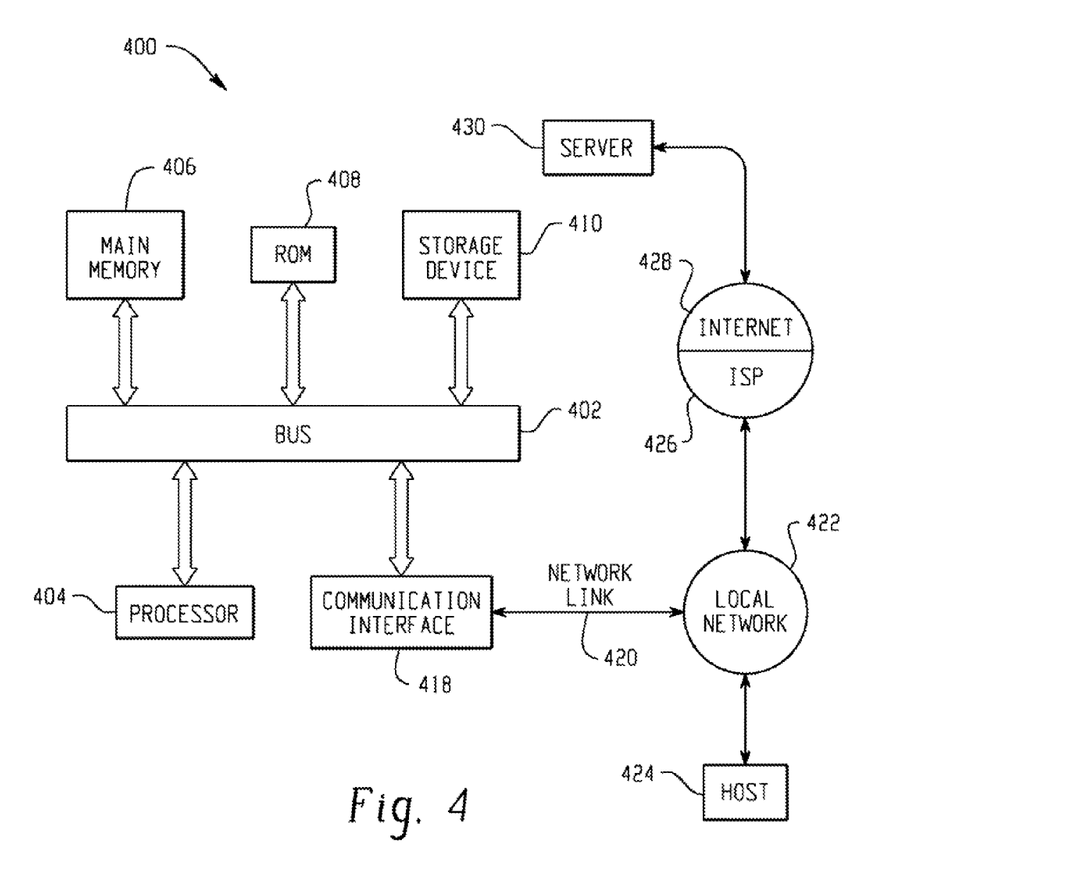
FIG. 4 illustrates an example of a computer system upon which an example embodiment can be implemented.

FIG. 4 is a block diagram that illustrates an example of a computer system 400 upon which an embodiment of the invention may be implemented. Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

An aspect of the invention is related to the use of computer system 400 for dynamically troubleshooting voice quality. According to one embodiment of the invention, dynamically troubleshooting voice quality is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to non-volatile media, volatile media, and transmission media. Non-volatile media include for example optical or magnetic disks, such as storage device 410. Volatile media include dynamic memory such as main memory 406. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communications through the worldwide packet data communication network, now commonly referred to as the "Internet" 428. Local networks 422 and Internet 428 both use electrical, electromagnetic, or optical signals that carry the digital data to and from computer system 400, are exemplary forms of carrier waves transporting the information.

Computer system 400 can send messages and receive data, including program codes, through the network(s), network link 420, and communication interface 418. In the Internet example, a server 430 might transmit a requested code for an application program through Internet 428, ISP 426, local network 422, and communication interface 418. In accordance with the invention, one such downloaded application provides for dynamically troubleshooting voice quality as described herein. The received code may be executed by processor 404 as it is received, and/or stored in storage device 410, or other non-volatile storage for later execution.

Figure 5:
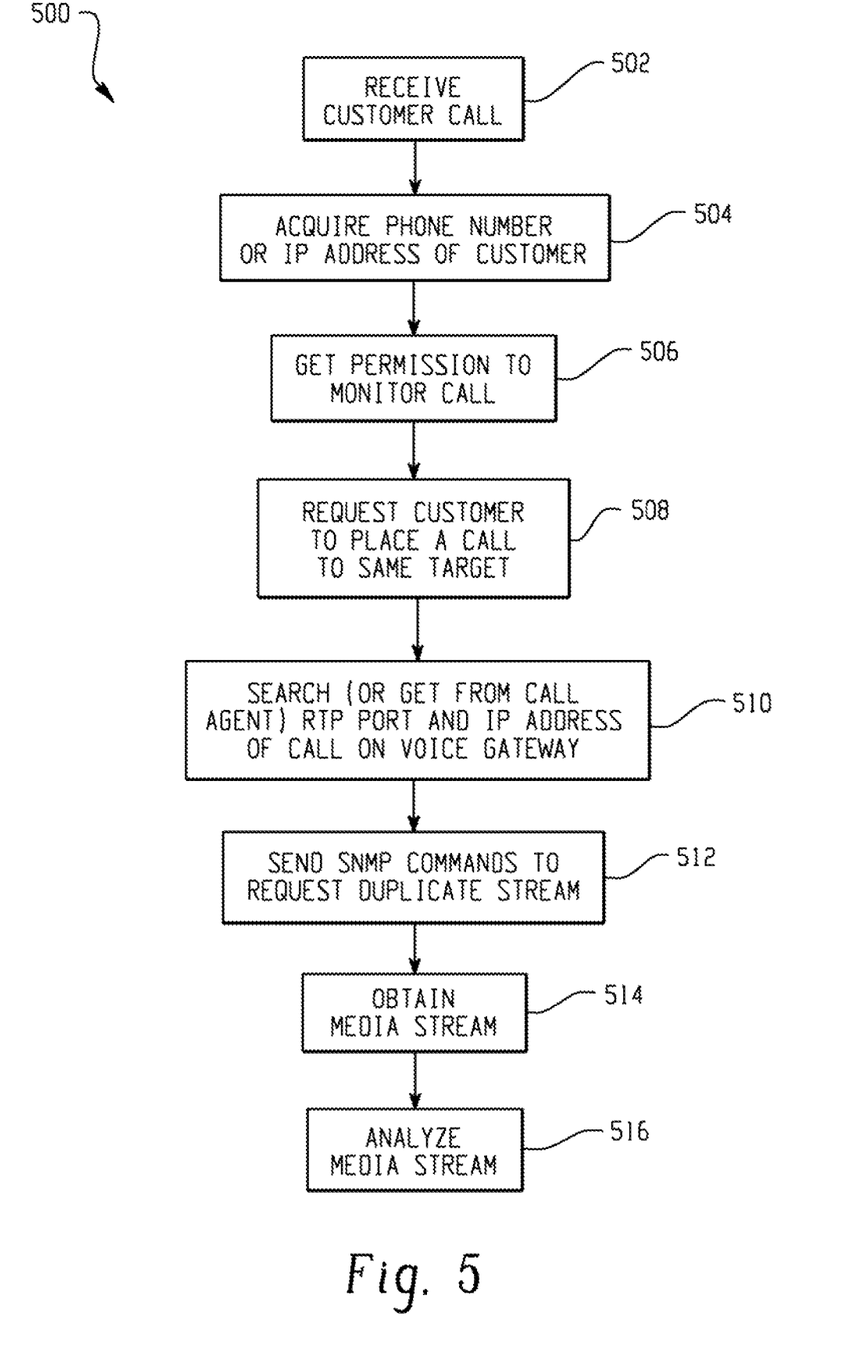
FIG. 5 illustrates an example methodology to dynamically troubleshoot voice quality.

In view of the foregoing structural and functional features described above, a methodology 500 in accordance with various aspects of the present invention will be better appreciated with reference to FIG. 5. While, for purposes of simplicity of explanation, methodology 500 of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

At 502, a customer calls a service provider to report voice quality issues on a telephone. For example, the customer may complain about static, dropped calls, etc. At 504, the phone number and/or IP address of the customer's phone is acquired. For example a network administrator or customer service representative can request the data, or an automated customer service center can be utilized to acquire the data. At 506, the customer's permission to monitor the call is obtained. At 508, the customer is instructed to place a call to a target device (or re-start the problem application). The target device can be the device at the telephone number that the customer last experienced voice quality issues.

At 510, a search is made for the Real-time Transport Protocol (RTP) port and/or IP address of the target call on a gateway, such as a voice and/or video gateway. In an example embodiment, the RTP port and IP address are obtained from a call agent. In another example embodiment, a network administrator may edit a TCL script that looks for the RTP port and IP port of the target call on a gateway (e.g., a voice and/or video gateway). The TCL script may also trigger SNMP commands for tapping the media as illustrated at 512. For example, the triggered SNMP commands may tap a media stream using TAP2MIB and citapStreamMIB as specified in RFC 3924 and TAP MIBS.

At 514, the media stream is obtained. In an example embodiment, a replicated copy of the media stream from the target call is obtained. The stream may be obtained based on provisioned MIB values.

AT 516, the voice stream is analyzed. Because the media stream can be obtained from the same server as the actual call, real-time analysis can be performed on the stream. The real-time analysis can include, but is not limited to, determining whether packets have errors and if so what kind of errors, whether media packets are being sent, malfunctions, etc. In an example embodiment, subjective methods of measuring voice quality may also be employed in analyzing the target call because the actual media stream is being analyzed.

For example, the communication content of the data stream (or a replicated copy of the data stream) can be employed to obtain a Mean Opinion Score (MOS) and/or a Packet Perceptual Speech Quality Measurement (PSQM). In an example embodiment, analyzing the data stream further can include analyzing signal parameters and/or the waveform of the replicated stream.

Although methodology 500 is illustrated and described for a voice stream, those skilled in the art should readily appreciate that methodology 500 is suitably adaptable to any type of data. For example, the data stream can be an audio stream, a voice stream, a video stream, an audiovisual stream, etc.

In addition to analyzing voice quality, intercept related information (IRI) data may also be acquired. For example, call setup data can be acquired from an ICE device. IRI data may include routing information, identify endpoints, length of call and/or other statistical data. For example, IRI data may suitably comprise call setup information for a Voice over Internet Protocol data stream. Furthermore, statistical data associated with the data stream may be acquired from an aggregation router in data communication with the predetermined data stream.

What has been described above includes example implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A computer implemented method for dynamically troubleshooting voice quality, the method, comprising:
    acquiring encrypted call setup information via a first stream;
    requesting a predetermined data stream on a network to analyze, wherein the requesting comprises searching for a Real-Time Transport Protocol port and an Internet Protocol address of the data stream at a voice gateway;
    determining an intercept access point the predetermined data stream passes through based on the call setup information;
    acquiring an encrypted replicated copy of the predetermined data stream, via a second stream, responsive to the request by intercepting the predetermined data stream at the intercept access point; and
    obtaining an audio representation of the encrypted replicated copy of the predetermined data stream thereby enabling an administrator to subjectively determine a quality of the predetermined data stream.

2. A method according to claim 1, wherein the predetermined data stream is acquired from a gateway server in data communication with an endpoint of the data stream.

3. A method according to claim 1, wherein the data stream is selected from a group consisting of a voice stream, a data stream and a video stream.

4. A method according to claim 1, wherein the data stream is a voice stream.

5. A method according to claim 4, wherein the analyzing the encrypted replicated copy of the predetermined data stream analyzes communication content; the analysis is selected from the group of consisting of generating a Mean Opinion Score for the encrypted replicated data stream and generating a Packet Perceptual Speech Quality Measurement for the encrypted replicated data stream.

6. A method according to claim 1, wherein the analyzing the encrypted replicated copy of the predetermined data stream further comprises analyzing signal parameters and a waveform of the encrypted replicated stream.

7. A method according to claim 1, wherein the analyzing the encrypted replicated copy of the predetermined data stream further comprises analyzing whether the encrypted replicated data stream contains data packets with errors.

8. A method according to claim 1, wherein the call setup information is for a Voice over Internet Protocol data stream.

9. An apparatus, comprising:
    means for acquiring encrypted call setup information via a first stream;
    means for generating a request to intercept a predetermined data stream on a network, the means for generating the request comprising means for searching for a Real-Time Transport Protocol port and an Internet Protocol address of the predetermined data stream at a voice gateway;
    means for determining an intercept access point the predetermined data stream passes through based on the call setup information;
    means for acquiring an encrypted replicated copy of the predetermined data stream, via a second stream, responsive to the request by intercepting the predetermined data stream at the intercept access point; and
    means for obtaining an audio representation of the encrypted replicated copy of the predetermined data stream for use by an associated administrator to subjectively determine a quality of the predetermined data stream.

10. A method according to claim 1, wherein:
    the obtaining the audio representation of the encrypted replicated copy of the predetermined data stream comprises obtaining an audio representation of the encrypted replicated copy of the predetermined data stream.

11. The apparatus set forth in claim 9, wherein:
    the means for obtaining the audio representation of the encrypted replicated copy of the predetermined data stream comprises means for obtaining an audio representation of the encrypted replicated copy of the predetermined data stream.

12. The apparatus set forth in claim 9, further comprising:
    means for analyzing a communication content of the encrypted replicated copy of the predetermined data stream, wherein the analyzing is selected from the group of consisting of generating a Mean Opinion Score for the encrypted replicated data stream and generating a Packet Perceptual Speech Quality Measurement for the encrypted replicated data stream.

13. A computer implemented method for dynamically troubleshooting voice quality, the method, comprising:
    acquiring encrypted call setup information via a first stream;
    acquiring a Real-Time Transport Protocol port and an Internet Protocol address of a predetermined data stream;
    requesting the predetermined data stream on a network using the acquired Real-Time Transport Protocol port and Internet Protocol address of the predetermined data stream at at least one of a voice gateway or a video gateway;
    determining an intercept access point the predetermined data stream passes through based on the call setup information;
    acquiring an encrypted replicated copy of the predetermined data stream, via a second stream, responsive to the request by intercepting the predetermined data stream at the intercept access point; and
    obtaining an audio representation of the encrypted replicated copy of the predetermined data stream thereby enabling an administrator to subjectively determine a quality of the predetermined data stream.

14. The method according to claim 13, wherein the predetermined data stream is acquired from a gateway server in data communication with an endpoint of the data stream.

15. The method according to claim 13, wherein the data stream is selected from a group consisting of a voice stream, a data stream and a video stream.

16. The method according to claim 13, wherein the analyzing the encrypted replicated copy of the predetermined data stream analyzes communication content;
the analysis is selected from the group of consisting of generating a Mean Opinion Score for the encrypted replicated data stream and generating a Packet Perceptual Speech Quality Measurement for the encrypted replicated data stream.

17. The method according to claim 13, wherein the analyzing the encrypted replicated copy of the predetermined data stream further comprises analyzing signal parameters and a waveform of the encrypted replicated stream.

18. The method according to claim 13, wherein the analyzing the encrypted replicated copy of the predetermined data stream further comprises analyzing whether the encrypted replicated data stream contains data packets with errors.

19. The method according to claim 13, wherein the call setup information is for a Voice over Internet Protocol data stream.

20. The method according to claim 13, wherein:
the obtaining the audio representation of the encrypted replicated copy of the predetermined data stream comprises obtaining an audio representation of the encrypted replicated copy of the predetermined data stream.

* * * * *